8908X
J. Gatling.
Rotary Cultivator.
Patented Jun. 19, 1835.
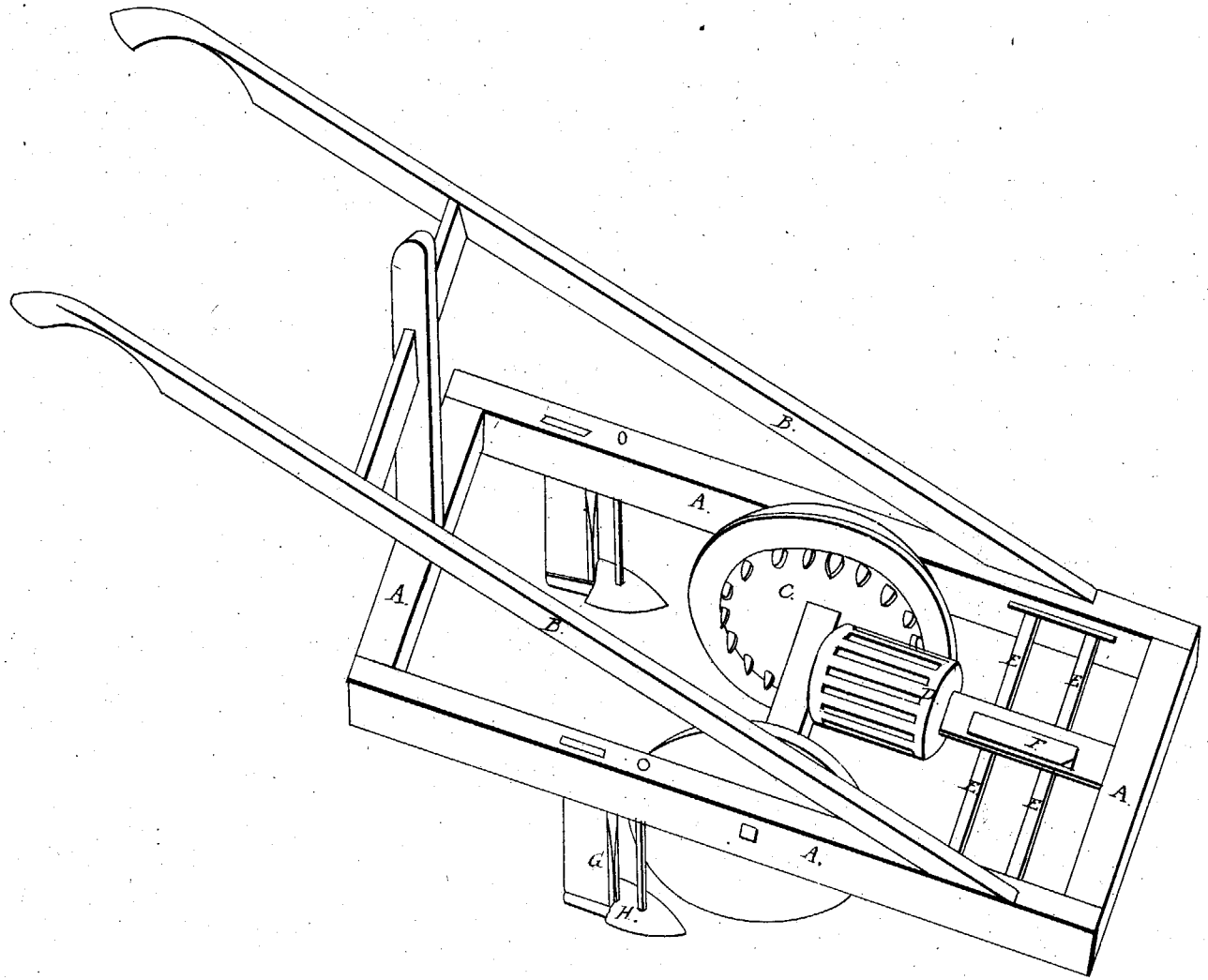
N. PETERS, PHOTO-LITHOGRAPHER, WASHINGTON, D. C.

June 19, 1835 6/19/1835 533

8908X

Jordan Gatling Murfreesborough North Carolina

Letters Patent

The schedule referred to in these Letters Patent and making part of the same containing a description in the words of the said Jordan Gatling himself of his improvement in the machine for thinning Cotton.

To all to whom these presents shall come Be it known that I Jordan Gatling of Murfreesborough in the County of Hertford and State of North Carolina have invented a new and useful improvement in the Machine for "Thinning Cotton" and that the following is a full and exact description of the construction and operation of the said machine as invented or improved by me. It has been devised for the purpose of facilitating and reducing labour of Thinning Cotton and that the operation of dirting up may follow immediately after that of thinning and may be drawn by animal power or any other. In the Construction an oblong frame is made of convenient width to stand [illegible] the row in order that the Centre of it may pass over the Cotton plants it may be of about the ordinary length of a plough and the two ends of the side pieces are connected by a bar running across from one to the other. At that end intended for the back is to rise an upright standard at each end of the cross piece through the upper part of which runs a brace for the purpose of sustaining the arms or handles of the frame at their proper distance asunder and which slope downwards to the frame which they join at the side pieces [illegible] about the Centre of the length. To the front cross piece is attached a swingle tree for the horse &c to draw by. In about the centre of the sides of this frame ^another crosspiece^ or axle is firmly secured from one to the other parallel with the [illegible] already described.

On each end of this piece is placed a wheel [illegible] loosely thereon and between the sides and of such a diameter as to raise the [illegible] enough above the plants & on these two wheels the weight of the frame is sustained [illegible] which causes them to revolve. One (say that on the right hand) is simply a wheel without teeth but the other has a row of cogs standing out from the side towards the Centre of the frame or in lines parallel with the axle which work in those of a [illegible] wheel of smaller dimensions proportioned to the number of revolutions or [illegible] of the Cotton [illegible] This [illegible] is secured upon an axis running through

8908X it having one of its gudgeons revolving in a hole sunk in the cross piece or axle & the other
gudgeon in another hole formed in the piece at the front end and it is situated in the cen-
tre of the frame and parallel with the sides. The revolution of the large wheel carry round
this trundle with them (it being fast on its axis) and between the end of it, and the
bar or cross piece in front, is secured on to the axis a square block through which is
passed an arm at each end through & through & projecting sufficiently from either side
to reach the cotton plants at their roots. Across these arms at their ends is secured a
thin piece of iron or steel to act as a hoe or cutter & to be of such a width as is desired
to thin out the plants & each end of these arms will thus form a hoe & if necessary
another pair may be passed at right angles with these in order that more or one
hoe only may be used as may be thought best. This axis with its trundle and
hoes may be placed either in front of the centre cross piece or behind it as will best
suit and in order to side up the cotton after the hoes there is to be placed behind
them and descending from the bottom of the side pieces a coulter & a horse hoe, or cul-
tivator tooth so as to ridge up the ground on one or both rows one side at a time
Should the plants be in some places too
thin so that it will be desirable to thin them out at occasional distances only
then the coulter and cultivator both may be dispensed with by which means
the hoes are placed more at command so that by simply raising either one end
or the other of the frame by the handles according as they are placed either before or
behind the centre cross piece they can be brought into action where the plants may
stand thickest, and withdrawn again at pleasure.
What I claim as my invention and not
before known in the above described machine is the manner in which I have
combined the operation of the wheels & hoes in the interior of the frame so as to produce
the application I have described of giving motion to the said hoes. In testimony
that the above is a full clear & exact description of the construction and mode
of operation of my machine as invented by me I have hereunto set my hand the
twenty fifth day of May Eighteen Hundred and thirty five Exd. Witnesses
[illegible] C. H. W. Wharton
Henry Stone Jordan Gotting

[illegible]

(Patented June 19. 1835)

(Drawing)